Nov. 22, 1960        F. J. SHELL        2,961,044
CEMENT COMPOSITIONS AND PROCESS OF CEMENTING WELLS
Filed June 17, 1957
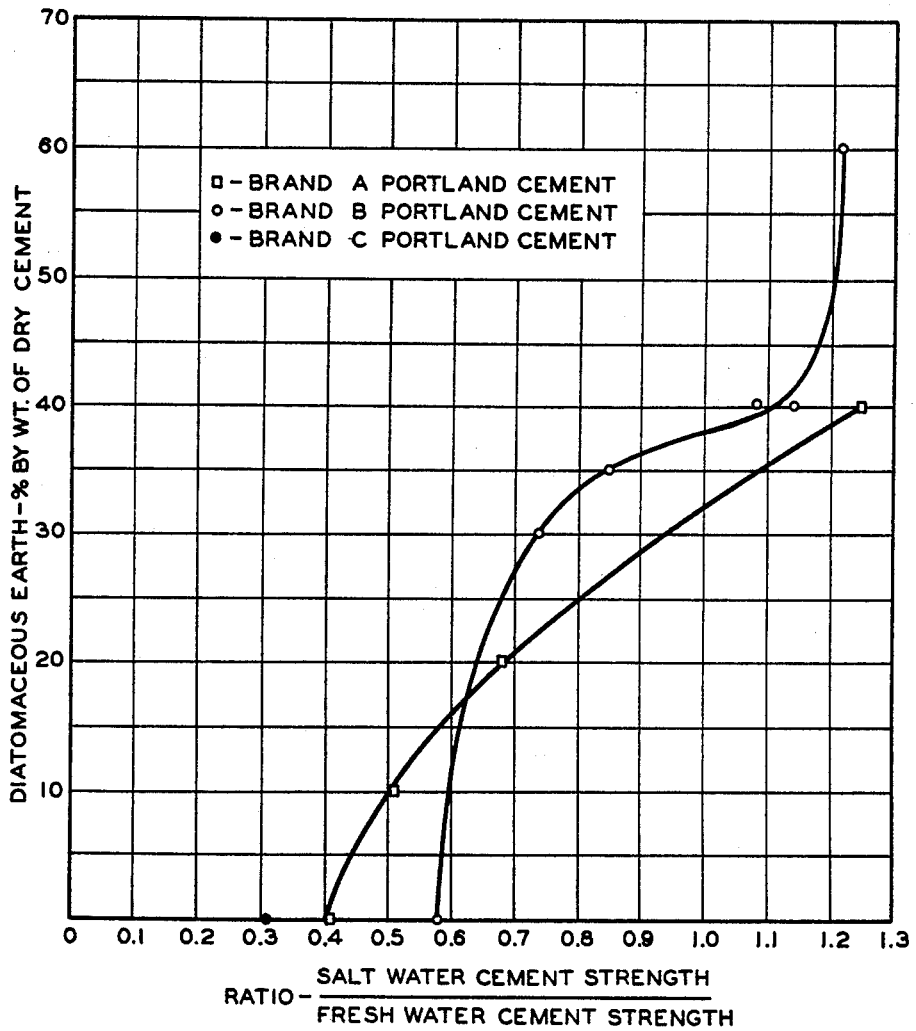
INVENTOR.
F. J. SHELL
BY Hudson and Young
ATTORNEYS

United States Patent Office 2,961,044
Patented Nov. 22, 1960

2,961,044
CEMENT COMPOSITIONS AND PROCESS OF CEMENTING WELLS

Francis J. Shell, Bartlesville, Okla., assignor to Phillips Petroleum Company, a corporation of Delaware Filed June 17, 1957, Ser. No. 665,885
22 Claims. (Cl. 166—21)

This invention relates to cement compositions and processes of cementing wells. In one aspect this invention relates to cement compositions wherein an agent is employed to offset adverse effects of sodium chloride in cementing operations.

The invention disclosed and claimed herein is an improvement on the invention disclosed and claimed in my copending application Serial No. 593,583, filed June 25, 1956.

Problems associated with cementing casing set through salt formations are many and varied. These problems arise from the salt formations themselves or from formations adjacent to salt deposits. Lost circulation or thief zones are sometimes encountered immediately above and below salt beds and may actually exist in the salt deposit. Lost circulation can be avoided or remedied, at least in part, by using the lightest possible cement slurry. These formations may also contain soluble salts which are highly corrosive to cement and casing. For this reason it is undesirable to attempt to decrease the slurry density with an additive which would make the cement more susceptible to attack by these corrosive materials. Additives which cause excessive expansion of the cement as it sets (alkali-aggregate reaction) should also be avoided. It is believed by some that the use of such materials in salt water cement has been responsible for casing collapse.

When cementing wells through salt formations penetrated by the well bore with cement prepared from fresh water, the salt from the formation tends to go into solution in the aqueous phase of the cement slurry. This results in leaching of salt from the formation and can prevent formation of a satisfactory bond between the cement and the formation. It would seem that one solution to this problem would be to saturate the mixing water employed to prepare the cement slurry with salt so as to decrease the solubility of salt from the formation in the water of the slurry. However, sodium chloride in amounts above about 20,000 parts per million has an adverse effect on the compressive strength of the set cement. It has been found that up to about 20,000 parts per million sodium chloride will increase the compressive strength of the set cement but above about 20,000 parts per million the compressive strength of the set cement decreases until, at the point where the water is saturated with sodium chloride, the compressive strength of the set cement is actually lower than the compressive strength of a cement slurry prepared with fresh water. When cementing through even moderately extensive salt formations, such as are encountered in many wells, it is possible for the water in the cement slurry to dissolve sufficient salt to reduce the compressive strength of the set cement below that of a cement formulated with fresh water.

I have found that the addition of diatomaceous earth to the cement formulation in sufficient amounts will offset the adverse effects of sodium chloride when said cement formulation contains sufficient sodium chloride to make the mixing water saturated with respect to sodium chloride. Thus, broadly speaking, my invention comprises incorporating in a cement formulation, containing sufficient sodium chloride to saturate the mixing water with respect to said sodium chloride, an amount of diatomaceous earth sufficient to produce a set cement having a compressive strength at least equal to or greater than the compressive strength of said set cement in the absence of sodium chloride. In other words, there is a diatomaceous earth concentration for cement formulations prepared with mixing water saturated with respect to sodium chloride at which the compressive strength of the salt water cement is at least equal to or greater than the compressive strength of the fresh water cement. Thus, when employing my invention it is possible to saturate with salt the mixing water used in the cement formulation and thus prevent damaging leaching from the formations penetrated by the well bore without incurring the adverse effects normally associated with using such amounts of sodium chloride.

In the cementing of oil wells it is customary to mix a hydraulic natural cement, for example a Portland or Portland type cement, with the requisite amount of water to form a pumpable neat slurry and to pump the mixture into the well and down the hole into the place where it is desired to have it set or harden. A customary practice is to pump said cement slurry down through the casing and either force it out the bottom of the casing upward into the annulus between said casing and the wall of the well bore, or to force said slurry through perforations in the casing into the formation to be sealed. In either case, the cement slurry is thus brought into contact with said casing and the earth formation penetrated by the bore hole which it is desired to seal off. In present oil well drilling practice, with wells commonly ranging from 6,000 to 12,000 feet or more in depth, using a substantially heavier cement slurry (density commonly more than 13 lb./gal.) than the drilling mud it replaces may result in forcing the cement out into the formation due to collapse of a friable formation, or displacement of the fluid in said formation by the heavier cement slurry, with the result that much cement is lost out into the formation instead of cementing much higher in the well in the annulus between the casing and the wall of the well. In some cases it is necessary to resort to costly stage cementing.

Thus, in the cementing of oil and gas wells, it is desirable to control the density of the cement slurry to about the same density as the density of the drilling mud used in drilling the well.

An object of this invention is to provide a suitable hydraulic natural cement aqueous slurry, and suitable process employing same, for cementing casing in wells, for squeeze cementing in wells, and for grouting cracks, fractures, or voids in natural formations such as in wells, or in man-made formations such as dams, breakwaters, walls, massive foundations, and structures of all types.

Another object of this invention is to provide a dry hydraulic natural cement powder formulation which in itself is a novel composition of matter, and which can be mixed with water to form an aqueous cement slurry which in itself is also a novel composition of matter and which has incorporated therein sufficient sodium chloride to at least saturate the mixing water employed in the cement formulation, and an amount of diatomaceous earth sufficient to produce a set cement having a compressive strength at least equal to or greater than the compressive strength of said set cement in the absence of said sodium chloride.

Other aspects, objects and advantages of the invention will be apparent to those skilled in the art in view of this disclosure.

Thus the invention provides new hydraulic natural cements, new hydraulic natural cement aqueous slurries, and processes for employing said cements and said slurries in well bores which penetrate salt or salt containing formations, which cement and cement slurries contain sufficient sodium chloride to saturate the mixing water with respect to sodium chloride, and also contain sufficient diatomaceous earth to offset the adverse effects of said sodium chloride on the compressive strength of the set cement.

It is within the scope of the invention to include ingredients other than those previously mentioned in the cement formulation so as to overcome other problems which are encountered in oil well cementing operations. Thus the invention includes the use of the various ingredients recited herein used in combination to obtain the beneficial effects of each which results from the coaction and/or cooperation of said ingredients. For example, the cement slurry must remain fluid long enough to permit it to be pumped into place and then it must set up with sufficient strength to support the well casing and properly seal off the well from penetrated formations. Thus it is desirable to control the thickening time of the cement slurry (which heat and pressure in deep wells tend to accelerate) and reduce water loss to porous formations penetrated by the well, which water loss to a porous formation can cause premature termination of the thickening time and premature set due to the loss of water to said porous formation. In the practice of the invention, this is done by adding an alkali metal carboxymethyl hydroxyethyl cellulose mixed ether, hereinafter called CMHEC, to the cement slurry.

However, it sometimes happens, particularly in shallow wells, that when using CMHEC as described, the setting or thickening time is increased too much. Therefore, to reduce the thus extended thickening time without reducing the water loss, it is sometimes desirable to add a thickening time accelerator. The presently preferred accelerator is an akali metal silicate having a silicon dioxide to alkali metal oxide mol ratio of from 1 to 2.5, preferably 1.6 to 2.5, more preferably 1.8 to 2.2.

In some instances 1 to 4 percent of bentonite is added to the cement slurry so as to increase the early strength of the set cement.

Thus the cement formulations of the invention can comprise, in addition to hydraulic natural cement and sodium chloride, at least one or more of the following ingredients which are useful in practicing the invention when using the percentages given in the column "Operable Amounts," and to give best results when using the percentages given in the column headed "Preferred Amounts" in the following Table I. The percentages given in said Table I, and elsewhere herein, are all weight percentages of the weight of the dry hydraulic cement employed in the cement composition. Said percentages are thus equivalent to parts by weight per 100 parts of dry cement.

TABLE I

| Materials | Operable Amounts, Percent | Preferred Amounts, Percent |
| --- | --- | --- |
| Bentonite | 0 to 4 | 1 to 4 |
| Diatomaceous Earth | 30 to 70 | a 30 to 60 |
| CMHEC b | 0.1 to 10 | 0.3 to 3 |
| AM silicate c | 0.1 to 15 | d 0.3 to 7 |
| Weighting agent e | 0 to 500 | | a 40% for 10.5 to 12 lbs. per gallon cement slurry densities, other slurry densities in proportion.
b CMHEC is used herein as an abbreviation for a cement thickening time extending and water loss reducing agent selected from the group consisting of acid carboxyalkyl hydroxyethyl cellulose mixed ethers in which the alkyl group contains one to two carbon atoms, preferably sodium carboxymethyl hydroxyethyl cellulose mixed ether, in which the total substitution per anhydroglucose unit of the cellulose of both carboxyalkyl and hydroxyethyl groups is between 0.5 to 1.75, the hydroxyethyl substitution is from 0.35 to 1.35, and the carboxyalkyl substitution is from 0.15 to 1.2, and all metal, ammonium, amide, and other salts of said mixed ethers, but preferably the alkali metal salts thereof. The amount of CMHEC varies with the amount of diatomaceous earth and other amounts in proportion. However, 0.1 to 10% gives results of some value in the practice of the invention over the same range of diatomaceous earth.
c AM silicate is used as an abbreviation for an alkali metal silicate, preferably sodium silicate, having a silicon dioxide to alkali metal oxide mol ratio of from 1 to 2.5. When the silicate used is sodium silicate the ratio of silicon dioxide to sodium oxide is conveniently referred to as a weight ratio because manufacturers of this chemical employ the weight ratio terminology. When sodium silicate is used the most preferred weight ratio for silicon dioxide ($SiO_2$) to sodium oxide ($Na_2O$) is 2.
d Depending on the thickening time desired. For example, 2.6% with 1.5% CMHEC and 40% diatomaceous earth in a well 6000 feet deep.
e The weighting agent can be any high density material such as barite, an oxide of iron, lead sulfide, iron phosphide, etc.

The amount of water used to make the slurry can vary widely as long as sufficient water is added to make the slurry fluid and pumpable. For example, the invention is operable with from about 140 to about 400 percent water by weight of the dry hydraulic natural cement. It is preferred to keep the amount of water used within the following limits when employing the indicated amounts of diatomaceous earth.

| D.E., Percent | Water, percent | |
| --- | --- | --- |
| | Min. | Max. |
| 30 | 140 | 180 |
| 40 | 170 | 300 |
| 60 | 250 | 360 |
| 70 | 330 | 400 |

Generally speaking, the more preferred amount of water for each amount of diatomaceous earth is about half way between the above shown minimum and maximum amounts of water. The maximum amount of water can be defined as the largest percent which can be contained in the slurry without resulting in appreciable settling of the solids in the slurry or excessive bleeding of water at the surface of the slurry. The minimum water content can be defined as the least amount which can be used without exceeding a consistency of 25 to 35 poises during the first 15 minutes as determined with the high pressure consistometer (A.P.I. Code 10B, fifth edition).

The amount of sodium chloride employed in the practice of the invention is an amount at least sufficient to saturate the mixing water employed in the cement formulation. It is customary to employ a slight excess over that theoretically required to saturate said mixing water so as to insure having the mixing water saturated with respect to sodium chloride. It has been found that an excess of as much as 25 weight percent based on the dry weight of the hydraulic cement can be used without adversely effecting the compressive strength of the set cement.

The bentonite employed can be either hydrated or unhydrated bentonite as weighed in the unhydrated normal state in which bentonite is generally sold and shipped. While it is preferred to use a good commercial grade such as Wyoming bentonite, any bentonite such as El Paso surface clay, Wilmington slough clay, and all bentonitic clay containing a high percentage of montmorillonites, particularly the sodium salt of montmorillonite are suitable, and the calcium or other salts of montmorillonites give valuable results in the practice of the invention of the same nature as the sodium salt in somewhat less degree.

The "Celite" brand of diatomaceous earth is preferred but any technical grade of diatomaceous or infusorial earth such as kieselguhr, guhr, diatomite, tripolite, tellurine, tetta silicea, ceyssatite, or fossil flour can be employed. The diatomaceous earth is preferably ground coarsely enough to preserve substantially at least a major portion of the diatom siliceous skeletons.

By hydraulic natural cement this invention intends to include all mixtures of lime, silica, and alumina, or of lime and magnesia, silica and alumina and iron oxide (magnesia for example may replace part of the lime, and iron oxide a part of the alumina), as are commonly known as hydraulic natural cements. Hydraulic natural cements include hydraulic limes, grappier cements, puzzolan cements, and Portland cements. Puzzolan cements include slag cements made from slaked lime and granulated blast furnace slag. Because of its superior strength Portland cement is preferred among the hydraulic natural cements, but as the art of cements recognizes hydraulic natural cements as a definite class, and as results of value may be obtained with any member of that class, it is desired to claim all hydraulic natural cements. In addition to the ordinary construction grades of Portland cement or other hydraulic natural cements, modified hydraulic natural cements and Portland cements designated as high-early-strength cement, heat resistance cement, and slow-setting cement may be used in the present invention. The "Condensed Chemical Dictionary," 3rd edition, 1942, published by Reinhold Publishing Corporation, New York, N.Y., page 173, column 2, paragraph 4, entitled "Natural Cements," shows the preceding definition and classification of hydraulic natural cements is recognized and followed by those skilled in the art.

Acid carboxymethyl hydroxyethyl cellulose mixed ether may be made from cellulose by reacting to form the carboxymethyl portion first and then the hydroxyethyl portion, or vice versa, or both at once. Reacting ethylene oxide with alkali cellulose is the commercial way to make hydroxyethylcellulose, see page 422 of the book "Cellulose Chemistry" by Heuser (1946) (John Wiley & Sons Inc., New York). The reaction is that of addition and is formulated as:

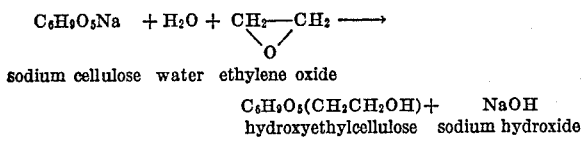

Other methods are mentioned on page 423 of said book. $C_6H_{10}O_5$ is one anhydroglucose unit of which there are many in each cellulose molecule.

On pages 421 and 422 of said book the preparation of carboxymethylcellulose (also known as glycolic acid ether of cellulose) is disclosed. It is formulated as:

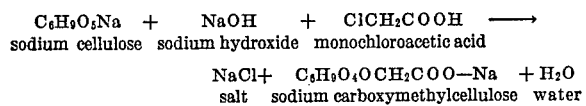

By reacting some of the cellulose hydroxyl groups in a sodium cellulose molecule with ethylene oxide and some with sodium hydroxide and monochloroacetic acid, sodium carboxymethyl hydroxyethyl cellulose mixed ether is formed. This may be converted to acid carboxymethyl hydroxyethyl cellulose mixed ether by reaction with an acid such as nitric acid and removal of the resulting sodium nitrate or other salt by purification, if purification is desired. When used in cement in the present invention, such purification is not always necessary. The substitution of both types of radicals need not be on the same anhydroglucose unit of the molecule; sometimes it is, and sometimes not. Nor is it necessary that all anhydroglucose units be reacted with either, as those units in the molecule that are so reacted will make the molecule active as a cement additive. It is preferred to have a combined substitution of carboxymethyl and hydroxyethyl radicals per anhydroglucose unit averaging from 0.5 to 1.75 in which the carboxymethyl radicals average from 0.15 to 1.2 and the hydroxyethyl radicals average from 0.35 to 1.35 but valuable results are still obtained outside of this range, especially if the mixed ether is water-soluble, or will hydrolyze to give water-soluble salts.

"Viscosity Grade" is a term sometimes employed in identifying samples of CMHEC. The so-called viscosity grade is defined in terms of the viscosity (expressed in centipoise) at 25° C. of an aqueous solution of the sodium salt of CMHEC). Solutions containing two percent by weight of CMHEC in water are used when the viscosity grade is less than about 1000 cp. For higher viscosity grades, the values are obtained using a one percent solution. Viscosity grade is believed to be a measure of the molecular weight or particle size distribution. However, the exact relationship between these two factors is not presently known, and other factors, such as the pH of the solution and the concentration of other electrolytes in the solution may affect the result. I have found that for relatively pure (90%) samples of the sodium salt of CMHEC which give solutions having a pH between about 5 and about 10, that viscosity grades between about 20 cp. and 40,000 cp. give satisfactory results for the control of water losses from aqueous cement slurries. High viscosity grades, while more difficult to disperse in the cement slurry, minimize the tendency of solids to settle from the slurry.

When the CMHEC is to be dry blended with the dry cement, it is preferred that the CMHEC be ground to a particle size less than 20 mesh, preferably less than 80 mesh. When the CMHEC is to be predissolved in the mixing water, or if the cement slurry is to be prepared from a dry blend of cement and CMHEC employing adequate agitation, then the particle size of the CMHEC is less important.

The alkali metal silicates of Table I, preferably sodium, potassium and lithium silicates, are most preferably sodium silicates having a silicon dioxide ($SiO_2$) to sodium oxide ($Na_2O$) weight ratio of from 1 to 2.5, preferably 1.6 to 2.5, and most preferably 2, because the latter figure gives good results in acceleration with the least detrimental effect on water loss. While said alkali metal silicates can be used as an anhydrous salt, a hydrated salt containing various amounts of water of hydration, and as predissolved solutions, the use of anhydrous salts and particularly sodium silicate dry anhydrous salt is preferred for dry blending with the cement. Alkali metal silicates, for example sodium silicates with these $SiO_2$ to $Na_2O$ ratios, are not compounds having a definite formula, but are intimate mixtures of molecular structures averaging such ratios. For example metasilicate $Na_2SiO_3$, disilicate $Na_2Si_2O_5$, tetrasilicate $Na_2Si_4O_9$ and many other silicates of different ratios may be present. It is operable to use from 0.1 to 15%, preferably 0.3 to 7%, of the alkali metal silicate, but the amount employed depends on the thickening time desired and the amount of CMHEC present and generally the deeper the well the less silicate need be used, and the shallower the well the more will be used. It is easy to make simple batch tests of sample mixtures of the cement at the well site before actually employing the cement and anyone skilled in the art can make these tests. However, the amount employed may be readily estimated from the data given in this application and good results will be obtained without such tests.

The following examples will serve to further illustrate the invention. Certain procedures employed in the execution of the examples are described as follows:

The thickening time is a measure of how long the cement slurry can remain fluid and hence pumpable. If the thickening time is too short to permit placement in the well, a successful cementing job will not be obtained; and remedial practices, costly in time and money, must be resorted to. Two measures of the thickening time are employed by those skilled in the art. Thickening times at atmospheric pressure are measured in Halliburton consistometers. The cement slurry is placed in a cylindrical cup which is rotated. The viscosity of the slurry is registered by measuring the torque on a paddle contained in the cup. For this atmospheric pressure test, the slurry is heated at a rate of approximately 2° per minute until the desired final temperature is reached, which temperature is then maintained. The time required for the slurry to reach 100 poises is called the thickening time and is dependent upon both temperature and pressure.

The compressive strength is determined upon samples of the slurry which have been cured to two-inch cube molds. The curing can be done at either atmospheric pressure at the desired temperature, or by simulating the pressure and temperature conditions which are encountered in the well. The atmospheric pressure determinations used herein are described in the previously mentioned API Code 10B.

TABLE II

DENSITY, 24 HOUR COMPRESSIVE STRENGTH, AND HALLIBURTON THICKENING TIME OF CEMENTS CONTAINING DIATOMACEOUS EARTH AND SODIUM CHLORIDE

| Diatom. Earth-Wt. Percent of Cement [1] | NaCl, Wt. Percent of Cement [1] | Water, Wt. Percent of Cement [1] | Density, lb./gal. | Comp. Str., p.s.i., 120° F. Cure | Ratio-Salt Water Str./Fresh Water Str., 120° F. Cure | Comp. Str., p.s.i., 140° F. Cure | Ratio-Salt Water Str./Fresh Water Str., 140° F. Cure | 80–180° F. Thick Time, hr:min. |
|---|---|---|---|---|---|---|---|---|
|  | 0 | 46 | 15.67 | 3,550 |  | 4,330 |  | 0:55 |
|  | 5 | 46 | 15.88 | 3,780 |  | 4,190 |  | 0:38 |
|  | 10 | 46 | 16.10 | 3,100 |  | 3,640 |  | 0:50 |
|  | ² 18 | 46 | 16.47 | 1,470 | 0.41 | 1,780 | 0.41 | 1:07 |
| 10 | 0 | 100 | 12.81 | 630 |  | 1,070 |  | 2:07 |
| 10 | 5 | 100 | 12.97 | 1,150 |  | 1,260 |  | 1:15 |
| 10 | 10 | 100 | 13.12 | 1,060 |  | 1,370 |  | 1:15 |
| 10 | 18 | 100 | 13.38 | 750 |  | 1,020 |  | 1:23 |
| 10 | ² 36.5 | 100 | 13.90 | 320 | 0.51 | 510 | 0.48 | 2:31 |
| 20 | 0 | 130 | 12.13 | 380 |  | 800 |  | 1:37 |
| 20 | 5 | 130 | 12.27 | 730 |  | 1,140 |  | 1:01 |
| 20 | 10 | 130 | 12.40 | 770 |  | 1,030 |  | 1:08 |
| 20 | 18 | 130 | 12.61 | 680 |  | 940 |  | 1:14 |
| 20 | ² 47 | 130 | 13.30 | 260 | 0.68 | 630 | 0.79 | 2:24 |
| 40 | 0 | 220 | 11.05 | 120 |  | 530 |  | 1:33 |
| 40 | 5 | 220 | 11.13 | 330 |  | 790 |  | 1:10 |
| 40 | 10 | 220 | 11.22 | 380 |  | 790 |  | 1:10 |
| 40 | 18 | 220 | 11.37 | 400 |  | 720 |  | 1:11 |
| 40 | ² 84 | 220 | 12.46 | 150 | 1.25 | 560 | 1.05 | 2:13 |

[1] Cement was Brand "A" Portland cement in all runs.
² Slight excess of salt to insure saturation.

Except where otherwise stated the cement composition slurries were prepared by dry blending the dry ingredients on a roller blender. The dry blend was added to a measured amount of water and slurried with a Waring Blendor or with a Kitchen Aid mixer in accordance with the procedure described in API Code RP 10B. Full details regarding such blending procedures can be found in the said code.

Example I

A series of cement aqueous slurries having the compositions given in Table II were prepared. Said Table II also lists densities and the results of compressive tests and thickening time tests on said cement composition slurries.

The results given in Table II are plotted as a curve for the brand A Portland cement in the drawing. Comparison of said results in Table II will show that when amounts of diatomaceous earth below about 30 percent are employed, that the compressive strength of the set cement follows the same general pattern as that for cement formulations containing no diatomaceous earth. That is, as increasing amounts of sodium chloride up to about 5 weight percent of the dry cement are included in the cement formulation the compressive strength of the set cement increases to an optimum value and then decreases to a value less than that of the cement slurry formulated without any sodium chloride. It was unexpectedly found, however, that when an amount of diatomaceous earth of at least about 30 percent by weight of the dry cement was incorporated in the cement formulation, the compressive strength of the set cement from cement formulations prepared with mixing water saturated with respect to sodium chloride was at least equal to, or greater than, the compressive strength of set cement from cement formulations prepared with fresh water. This is shown graphically in the drawing at the point where the curve crosses the 1.0 ratio line (ratio of salt water cement strength/fresh water cement water strength).

Example II

A second series of cement composition aqueous slurries having the compositions given in Table III below were prepared as previously described.

TABLE III

24-HOUR COMPRESSIVE STRENGTH OF CEMENTS CONTAINING DIATOMACEOUS EARTH AND SODIUM CHLORIDE WHEN CURED AT 120° F. AND ATMOSPHERIC PRESSURE

| Diatomaceous Earth, Wt. Percent of Cement | NaCl, Wt. Percent of Cement | Water, Wt. Percent of Cement | Compressive Strength, p.s.i. | Ratio, Salt Water Strength divided by Fresh Water Strength |
|---|---|---|---|---|

BRAND "B" PORTLAND CEMENT

| | | 46 | 4,497 | |
| | ᵃ 16.66 | 46 | 2,615 | 0.58 |
| | ᶜ 41.66 | 46 | 2,475 | 0.55 |
| 30 | | 170 | 327 | |
| 30 | ᵇ 64 | 170 | 243 | 0.74 |
| 35 | | 200 | 149 | |
| 35 | ᵇ 75 | 200 | 127 | 0.85 |
| 40 | | 220 | 128 | |
| 40 | ᵃ 80 | 220 | 138 | 1.08 |
| 40 | ᵇ 84 | 220 | 146 | 1.14 |
| 40 | ᶜ 109 | 220 | 145 | 1.13 |
| 60 | | 300 | 93 | |
| 60 | ᵇ 110 | 300 | 113 | 1.21 |

BRAND "C" PORTLAND CEMENT

| | | 46 | 3,527 | |
| | ᵃ 16.66 | 46 | 1,080 | 0.31 |
| | ᶜ 41.66 | 46 | 930 | 0.26 |

BRAND "D" PORTLAND CEMENT

| | | 46 | 3,165 | |
| | ᵃ 16.66 | 46 | 1,993 | 0.41 |
| | ᵃ 18.0 | 46 | 1,158 | 0.37 |
| | ᶜ 41.66 | 46 | 993 | 0.31 |

ᵃ Mixing water saturated with respect to NaCl.
ᵇ Mixing water saturated with respect to NaCl plus slight excess salt.
ᶜ Mixing water saturated with respect to NaCl plus 25 per cent excess on weight of dry cement.

The results of Table III are shown graphically in the drawing where said results are plotted as the curve for Brand B Portland cement. Table III also shows that amounts of sodium chloride equal to the saturation amount plus an excess of 25 weight percent based on the dry weight of the cement can be used without adverse effect on the compressive strength of the said cement.

As mentioned above, valuable results can be obtained in the practice of the invention when employing a wide variety of diatomaceous earths. However, not all diatomaceous earths are equivalent because not all diatomaceous earths will permit the use of sufficient water to obtain the desired low densities. This is shown by the following examples wherein the maximum amount of water which could be added without causing excessive bleeding was determined for seventeen different diatomaceous earths.

*Example III*

Weighed amounts of the candidate diatomaceous earth and Portland cement were dry blended on a roller blender. The blend was added to a measured amount of water and slurried for 25 seconds in a Waring Blendor in accordance with the procedure described in API Code RP 10B. The blendor was connected to an automatic timer to insure constant time of mixing. Slurry densities were measured with a mud balance. Bleeding values for the different slurries were determined by placing 250 milliliters of slurry in a 250 ml. graduated mixing cylinder having an internal diameter of 3.7 cm.±0.3 cm. and allowing it to stand at room temperature (70 to 85° F.) for three hours. Any supernatant water at the surface of the slurry was recorded as ml. of bleeding. To obtain a more accurate reading, the supernatant liquid was transferred to a 10 or 25 ml. cylinder for measuring. The amount of bleeding under these conditions should be less than 1 percent by volume and the upper and lower portions of the slurry should have the same density to within ±0.1 pound per gallon. The term "bleeding value" as used herein and in the claims is defined as the volume of water in milliliters which separates from 250 ml. of the slurry as supernatant liquid when the slurry is allowed to remain quiescent for three hours at 70–85° F. in a 250 ml. graduated mixing cylinder having an internal diameter of 3.7 cm.±0.3 cm. The preferred maximum bleeding value is less than 2.5 and in all cases, the maximum bleeding value should not exceed 3.0. Table IV below gives the results of bleeding value tests for 14 of the diatomaceous earths tested. In all cases, 100 parts by weight of cement were used.

TABLE IV

| Diatomaceous Earth | | Water, Parts by Weight | Density, lb./gal. | Bleeding Value Free Water, ml. |
| --- | --- | --- | --- | --- |
| No. | Parts by Wt. | | | |
| 1 | 40 | 210 | 11.2 | 14 |
| 2 | 40 | 210 | 11.0 | 23 |
| 3 | 40 | 210 | 11.1 | 7 |
| 4 | 40 | 210 | 10.9 | 0 |
| 4 | 40 | 220 | 10.85 | 0 |
| 4 | 40 | 230 | 10.8 | 1 |
| 4 | 40 | 240 | 10.7 | 4 |
| 4 | 40 | 230 | 10.85 | 1 |
| 5 | 40 | 230 | 10.85 | 1 |
| 6 | 40 | 230 | 10.9 | 28 |
| 7 | 40 | 230 | 11.0 | 25 |
| 8 | 40 | 230 | 11.0 | 25 |
| 9 | 40 | 230 | 11.0 | 28 |
| 10 | 40 | 230 | 10.8 | 2 |
| 11 | 40 | 230 | 11.0 | 7 |
| 12 | 40 | 220 | 10.95 | 8 |
| 13 | 40 | 220 | 10.95 | 2 |
| 14 | 40 | 220 | 11.05 | 4 |
| 4 | 60 | 320 | 10.3 | 2 |
| 4 | 60 | 310 | 10.4 | 0 |

It is evident from a comparison of the data given in Table IV that the diatomaceous earths are not equivalent. Of the fourteen diatomaceous earths tested, only four i.e., Nos. 4, 5, 10, and 13 acceptable. In all of the others, the amount of water which separated was excessive. Diatomaceous earth No. 4 is the Celite brand of diatomaceous earth used in those examples herein wherein only one diatomaceous earth is mentioned.

*Example IV*

A series of cement composition slurries containing 100 parts by weight of Portland cement, 40 parts by weight of different candidate diatomaceous earths, and water in the amounts shown in Table V below, were prepared to compare three additional diatomaceous earths with diatomaceous earth No. 4. The said slurries were tested in the manner described in Example III. The results of these tests are given in Table V below.

TABLE V

| Diatomaceous Earth No. | Water, parts by wt. | Density, lb./gal. | Bleeding Value Free Water, ml. |
| --- | --- | --- | --- |
| 4 | 210 | 11.2 | 0 |
| 15 | 210 | 11.2 | 1 |
| 16 | 210 | 11.2 | 3.5 |
| 17 | 210 | 11.25 | 2 |
| 4 | 220 | 11.05 | 1 |
| 15 | 220 | 11.05 | 2.5 |
| 16 | 220 | 11.05 | 6.5 |
| 17 | 220 | 11.12 | 2.5 |
| 4 | 230 | 10.95 | 0 |
| 15 | 230 | 10.95 | 2 |
| 16 | 230 | 10.95 | 8 |
| 17 | 230 | 11.0 | 3 |
| 4 | 240 | 10.8 | 0.5 |
| 15 | 240 | 10.85 | 2 |
| 16 | 240 | 10.85 | 10 |
| 17 | 240 | 10.9 | 4 |
| 4 | 250 | 10.65 | 1.5 |
| 15 | 250 | 10.7 | 3 |
| 16 | 250 | 10.7 | 12 |
| 17 | 250 | 10.75 | 6 |
| 4 | 260 | 10.6 | 2 |
| 15 | 260 | 10.6 | 3.5 |
| 16 | 260 | 10.6 | 15 |
| 17 | 260 | 10.65 | 8 |
| 4 | 280 | 10.5 | 3 |
| 15 | 280 | 10.5 | 4.5 |
| 16 | 280 | 10.5 | 20 |
| 17 | 280 | 10.55 | 13 |

A comparison of the data given in Table V shows that diatomaceous earth No. 16 is clearly not acceptable. Diatomaceous earth No. 15 is acceptable only through the range of 250 parts by weight of water or less, and diatomaceous earth No. 17 is acceptable only through the range of 230 parts by weight of water or less. Diatomaceous earth No. 4 again was acceptable throughout the entire range tested. Thus out of the seventeen diatomaceous earths listed in Tables IV and V, only six (35%) i.e., Nos. 4, 5, 10, 13, 15, and 17 are acceptable and Nos. 15 and 17 are acceptable only for a limited range.

Diatomaceous earth Nos. 5, 10, and 15 are highly refined products and while they pass the above bleeding tests for use according to the invention their costs prohibits their use in commercial cement slurries. Thus out of the seventeen diatomaceous earths listed in Tables IV and V only three i.e., Nos. 4, 5, and 10, are acceptable without qualification.

*Example V*

A series of cement composition slurries containing 100 parts by weight of Portland cement, 1.5 parts by weight NaCMHEC, 3.0 parts by weight of powdered anhydrous sodium silicate having a silica to soda weight ratio of 2.0, 40 parts by weight of diatomaceous earth, and the amounts of water shown in Table VI below were prepared. Said slurries were tested for bleeding values in accordance with the method given in Example III, and tested for water loss values in accordance with the procedure given in API Code 29. The results of these tests are given in Table VI below.

TABLE VI

| Diatomaceous Earth No. | Water, parts by wt. | Bleeding Value, Free Water, ml. | Initial Water-Loss, ml. in 30 min. |
| --- | --- | --- | --- |
| 17 | 180 | 0 | 45 |
| 17 | 200 | 0 | 64 |
| 4 | 220 | 0 | 18 |
| 15 | 220 | 0 | 86 |
| 16 | 220 | 5 | 91 |
| 17 | 220 | 3 | 77 |
| 4 | 240 | 1 | 18 |
| 15 | 240 | 4 | 99 |
| 16 | 240 | 9 | 102 |
| 17 | 240 | 6 | 82 |
| 4 | 260 | 2 | 21 |

A comparison of the data given in Table VI shows that while diatomaceous earths Nos. 15 and 17 can be used to give valuable results in the low water loss cement systems of the invention because the water loss values are all below 100, the said diatomaceous earths are inferior to diatomaceous earth No. 4. It will be noted that diatomaceous earth No. 4 gave initial water loss values of 18 to 21 whereas diatomaceous earths Nos. 15 and 17 gave water loss values ranging from 45 to 99. Thus it is evident that more CMHEC would be required to give the same water loss value as 1.5 parts by weight of CMHEC gives when used with diatomaceous earth No. 4. The above results clearly indicate that diatomaceous earth No. 4 is more compatible with CMHEC.

Thus the preferred diatomaceous earth for using according to the invention is one which has the property, when mixed with cement and slurried with water in the ranges set out above, of producing a slurry having a bleeding value of not more than three. A more preferred diatomaceous earth is one which also exhibits a high order of compatibility with CMHEC.

While several illustrative examples have been given above, the invention is not limited thereto. Various other modifications of the invention can be made or followed, in view of the above disclosure, without departing from the spirit or scope of the invention.

I claim:

1. A well cementing composition for cementing casing in wells which penetrate a salt formation, and which is capable of forming a pumpable slurry when mixed with water, which composition consists essentially of dry hydraulic natural cement, from 30–70 weight percent of the dry weight of said hydraulic natural cement of diatomaceous earth, and sufficient sodium chloride to at least saturate said water with respect to sodium chloride, said diatomaceous earth having the property of forming an essentially non-settling slurry having a bleeding value of not more than three when said cement and said diatomaceous earth are blended with a sufficient amount of said water to produce said slurry.

2. A well cementing composition for cementing casing in wells which penetrate a salt formation, and which is capable of forming a pumpable slurry when mixed with water, which composition consists essentially of: dry hydraulic natural cement; sufficient sodium chloride to at least saturate said water; and an amount of diatomaceous earth equal to from 30 to 70 weight percent of the dry weight of said hydraulic natural cement and sufficient to produce a set cement having a compresssive strength at least equal to the compressive strength of a set cement produced from a like composition containing no sodium chloride, said diatomaceous earth having the property of forming an essentially non-settling slurry having a bleeding value of not more than three when said cement and said diatomaceous earth are blended with a sufficient amount of said water to produce said slurry.

3. The composition of claim 1 wherein said diatomaceous earth is ground coarsely enough to substantially preserve the major portion of the siliceous structure of the diatoms therein, and wherein there is also present in said composition, from 0.1 to 10% by weight of the dry weight of said cement of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers.

4. The composition of claim 3 wherein there is also present in said composition from 0.1 to 15 weight percent of the dry weight of said cement of a cement thickening time reducing agent having substanitally no effect on said water loss consisting of an alkali metal silicate having a silicon dioxide mol ratio of from 1 to 2.5.

5. The composition of claim 4 wherein there is also present in said composition, from 1 to 4 weight percent of the weight of said hydraulic natural cement of bentonite.

6. A well cementing composition aqueous pumpable slurry for cementing casing in wells which penetrate a salt formation, and which consists essentially of a dry hydraulic natural cement mixed with weight percentages of the weight of said dry hydraulic natural cement of from 30 to 70 percent diatomaceous earth, from 140 to 400 percent of water, and sufficient sodium chloride to at least saturate said water with respect to said sodium chloride, said diatomaceous earth having the property of forming an essentially non-settling slurry having a bleeding value of not more than three when said cement and said diatomaceous earth are blended with a sufficient amount of said water to produce said slurry.

7. A well cementing composition aqueous slurry for cementing casing in wells which penetrate a salt formation, and which consists essentially of: dry hydraulic natural cement; sufficient water to produce a pumpable slurry; sufficient sodium chloride to at least saturate said water with respect to sodium chloride; and an amount of diatomaceous earth equal to from 30 to 70 weight percent of the dry weight of said hydraulic natural cement and sufficient to produce a set cement having a compressive strength at least equal to the compressive strength of a set cement produced from a like slurry containing no sodium chloride, said diatomaceous earth having the property of forming an essentially non-settling slurry having a bleeding value of not more than three when said cement and said diatomaceous earth are blended with a sufficient amount of said water to produce said slurry.

8. The composition of claim 6 wherein said diatomaceous earth is ground coarsely enough to substantially preserve the major portion of the siliceous structure of the diatoms therein, and wherein there is also present in said composition, from 0.1 to 10 percent of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, the hydroxyethyl substitution is from 0.35 to 1.35, and the carboxyalkyl substitution is from 0.15 to 1.2, and salts of said mixed ethers.

9. The composition of claim 8 wherein there is also present in said composition, from 0.1 to 15 percent of a cement thickening time reducing agent having substantially no effect on said water loss consisting of an alkali metal silicate having a silicon dioxide to alkali metal oxide mol ratio of from 1 to 2.5.

10. The composition of claim 9 wherein therein is also present in said composition, from 1 to 4 weight percent of the weight of said hydraulic natural cement of bentonite.

11. The composition of claim 6 wherein the amount of said diatomaceous earth is from 30 to 60 weight percent of the dry weight of said hydraulic natural cement, the amount of said water is from 140 to 360 weight percent of the dry weight of said hydraulic natural cement, and the amount of said sodium chloride ranges from an amount sufficient to saturate said water to an amount equal to said saturation amount of sodium chloride plus an excess equal to at least 25 percent of the dry weight of said hydraulic natural cement.

12. The composition of claim 6 wherein the amount of said diatomaceous earth is from 40 to 60 weight percent of the dry weight of said hydraulic natural cement, the amount of said water is from 170 to 360 weight percent of the dry weight of said hydraulic natural cement, and the amount of said sodium chloride ranges from an amount sufficient to saturate said water to an amount equal to said saturation amount of sodium chloride plus an excess equal to at least 25 percent of the dry weight of said hydraulic natural cement.

13. A method of cementing a casing in a well which penetrates a salt formation in the earth which method comprises pumping a cement composition aqueous slurry into the annular space between said casing and the bore hole and into contact with said casing and said salt formation penetrated by said bore hole, said cement composition aqueous slurry consisting essentially of: a dry hydraulic natural cement mixed with weight percentages of the weight of said dry hydraulic natural cement of from 30 to 70 percent diatomaceous earth, from 140 to 400 percent of water, and sufficient sodium chloride to at least saturate said water with respect to said sodium chloride, said diatomaceous earth having the property of forming an essentially non-settling slurry having a bleeding value of not more than three when said cement and said diatomaceous earth are blended with a sufficient amount of said water to produce said slurry.

14. A method of cementing a casing in a well which penetrates a salt formation in the earth which method comprises pumping a cement composition aqueous slurry into the annular space between said casing and the bore hole and into contact with said casing and said salt formation penetrated by said bore hole, said cement composition aqueous slurry consisting essentially of a dry hydraulic natural cement; sufficient water to produce a pumpable slurry; sufficient sodium chloride to at least saturate said water with respect to sodium chloride; and an amount of diatomaceous earth equal to from 30 to 70 weight percent of the dry weight of said hydraulic natural cement and sufficient to produce a set cement having a compressive strength at least equal to the compressive strength of a set cement produced from a like slurry containing no sodium chloride, said diatomaceous earth having the property of forming an essentially non-settling slurry having a bleeding value of not more than three when said cement and said diatomaceous earth are blended with a sufficient amount of said water to produce said slurry.

15. The method of claim 13 wherein said diatomaceous earth is ground coarsely enough to substantially preserve the major portion of the siliceous structure of the diatoms therein, and wherein therein is also present in said composition from 0.1 to 10% of a cement thickening time extending and water loss reducing agent selected from the group consisting of acid carboxyalkyl hydroxyethyl cellulose mixed ethers in which the alkyl group contains one to two carbon atoms, the total substitution per anhydroglucose unit of the cellulose of carboxyalkyl and hydroxyethyl groups is between 0.5 to 1.75, and hydroxyethyl substitution is from 0.35 to 1.35, and the carboxyalkyl substitution is from 0.15 to 1.2, and salts of said mixed ethers.

16. The method of claim 15 wherein there is also present in said composition from 0.1 to 15 percent of a cement thickening time reducing agent having substantially no effect on said water loss consisting of an alkali metal silicate having a silicon dioxide to alkali metal mol ratio of from 1 to 2.5.

17. The method of claim 16 wherein there is also present in said compositions, from 1 to 4 weight percent of the weight of said hydraulic natural cement of bentonite.

18. The method of claim 13 wherein the amount of said diatomaceous earth is from 30 to 60 weight percent of the dry weight of said cement, the amount of said water is from 140 to 360 weight percent of the dry weight of said cement, and the amount of said sodium chloride ranges from an amount sufficient to saturate said water to an amount equal to said saturation amount of sodium chloride plus an excess of sodium chloride equal to at least 25 weight percent of said dry hydraulic natural cement.

19. The method of claim 13 wherein the amount of said diatomaceous earth is from 40 to 60 weight percent of the dry weight of said cement, the amount of said water is from 170 to 360 weight percent of the dry weight of said cement, and the amount of said sodium chloride ranges from an amount sufficient to saturate said water to an equal amount to said saturation amount of sodium chloride plus an excess of sodium chloride equal to at least 25 weight percent of said dry hydraulic natural cement.

20. The composition of claim 4 wherein said alkali metal silicate is sodium silicate.

21. The composition of claim 9 wherein said alkali metal silicate is sodium silicate.

22. The method of claim 16 wherein said alkali metal silicate is sodium silicate.

References Cited in the file of this patent

UNITED STATES PATENTS

| | | |
|---|---|---|
| 1,305,522 | Caven | June 3, 1919 |
| 2,336,723 | Drummond | Dec. 14, 1943 |
| 2,427,683 | Ludwig | Sept. 23, 1947 |
| 2,582,459 | Salathiel | Jan. 15, 1952 |
| 2,771,953 | Kaveler | Nov. 27, 1956 |
| 2,852,402 | Shell | Sept. 16, 1958 |

OTHER REFERENCES

"Celite for Concrete," pamphlet BMM-350 of Johns Manville Co., published in August 1935; 2 pp.

N. C. Ludwig: The Oil and Gas Journal, vol. 50, May 24, 1951, pp. 125, 126 and 128.

UNITED STATES PATENT OFFICE
CERTIFICATION OF CORRECTION

Patent No. 2,961,044                       November 22, 1960

Francis J. Shell

It is hereby certified that error appears in the above numbered patent requiring correction and that the said Letters Patent should read as corrected below.

Column 12, line 2, after "dioxide" insert -- to alkali metal oxide --.

Signed and sealed this 23rd day of May 1961.

(SEAL)
Attest:

ERNEST W. SWIDER                          DAVID L. LADD
Attesting Officer                           Commissioner of Patents